United States Patent [19]

Haymore

[11] Patent Number: 5,149,242
[45] Date of Patent: Sep. 22, 1992

[54] VERTICAL DRIVE APPARATUS FOR STORAGE AND RETRIEVAL VEHICLES

[75] Inventor: Ralph B. Haymore, Salt Lake City, Utah

[73] Assignee: Eaton-Kenway, Inc., Salt Lake City, Utah

[21] Appl. No.: 653,837

[22] Filed: Feb. 11, 1991

[51] Int. Cl.⁵ .............................................. B65G 1/00
[52] U.S. Cl. .................................... 414/279; 187/11; 187/27; 254/323; 254/DIG. 9; 414/282
[58] Field of Search ............... 414/277, 279, 281, 282; 187/11, 20, 27; 188/65.1, 170, 171; 254/267, 276, 280, 286, 323-325, 327, 333, 334, 358, 359, 902, DIG. 9

[56] References Cited

U.S. PATENT DOCUMENTS

| | | | |
|---|---|---|---|
| 2,057,435 | 10/1936 | Kimble | 254/266 X |
| 2,702,095 | 2/1955 | Kelly | 187/11 X |
| 3,385,401 | 5/1966 | Campbell et al. | 187/11 |
| 3,770,147 | 11/1973 | Kito et al. | 414/282 |
| 3,887,038 | 6/1975 | Buschbom et al. | 187/27 |
| 4,119,299 | 10/1978 | Dietrich et al. | 254/378 |
| 4,331,418 | 5/1982 | Klebe | 414/277 |
| 4,390,161 | 6/1983 | Nelson | 254/378 X |
| 4,470,487 | 9/1984 | Blatt | 188/170 |
| 4,529,066 | 7/1985 | Wieschel | 414/279 X |
| 4,663,128 | 5/1987 | Helgeland | 254/332 X |
| 4,779,844 | 10/1988 | Mitchell | 254/323 |
| 4,820,109 | 4/1989 | Witt | 414/282 |
| 5,020,957 | 6/1991 | Liston | 414/279 |

FOREIGN PATENT DOCUMENTS

| | | | |
|---|---|---|---|
| 78874 | 5/1983 | European Pat. Off. | 187/27 |
| 1481149 | 1/1969 | Fed. Rep. of Germany | 414/281 |
| 2545630 | 7/1976 | Fed. Rep. of Germany | 187/27 |
| 2390371 | 1/1979 | France | 187/11 |
| 53-131650 | 11/1978 | Japan | 187/27 |
| 1-236189 | 9/1989 | Japan | 187/20 |
| 313766 | 12/1971 | U.S.S.R. | 187/27 |
| 451603 | 12/1974 | U.S.S.R. | 187/20 |
| 502822 | 4/1976 | U.S.S.R. | 187/27 |
| 609707 | 6/1978 | U.S.S.R. | 187/20 |
| 1444268 | 12/1988 | U.S.S.R. | 187/20 |
| 2199299 | 7/1988 | United Kingdom | 187/27 |

Primary Examiner—Michael S. Huppert
Assistant Examiner—Robert S. Katz
Attorney, Agent, or Firm—Lynn G. Foster

[57] ABSTRACT

A novel vertical drive assembly for a storage and retrieval vehicle wherein a cable drive motor is horizontally juxtaposed between a lift cable winding and unwinding drum. The vertical drive assembly is modularly assembled on a frame and is attachable and detachable from the vehicle as a unit. The vertical drive assembly comprises, in seriatim, the motor, a belt drive sprocket wheel, a drive belt, a belt driven sprocket wheel, and, juxtaposed and on the same axis as the driven sprocket wheel, an input adapter, a speed reducer, and the drum. The motor is attached to the frame by jacks used to raise and lower the motor to adjust tension in the belt. To stay within the width of the vehicle, the input adapter and speed reducer are at least partly disposed within the core of the drum with the speed reducer providing a bearing for the drum. To reduce starting inertia, sprocket wheels are fabricated from lightweight material. Drum supports comprise louvered blades to induce air flow over the speed reducer when the drum rotates. In one embodiment, a concentric disc, spring actuated, electrically-released brake is mounted on the axis of the motor when the length of the combination motor and brake is less than the width of the vehicle. In another embodiment, a disc brake comprising pneumatic release and spring actuation is juxtaposed between the driven sprocket wheel and the input adapter. Interlocks prevent the vehicle from operating when air pressure is below a predetermined level.

12 Claims, 7 Drawing Sheets

VERTICAL DRIVE APPARATUS FOR STORAGE AND RETRIEVAL VEHICLES

FIELD OF INVENTION

This invention relates to storage and retrieval (S/R) vehicles and more particularly to vertical drive assemblies for S/R vehicles.

BACKGROUND AND DESCRIPTION OF RELATED ART

Generally, S/R vehicles comprise three operational degrees of freedom. The first degree of freedom constitutes longitudinal movement along an aisle of a S/R facility whereby each vehicle accesses the position of each column of material stored along that aisle. Material is stored on shelving or the like in horizontally and vertically addressable arrays such that inventory is transported between the arrays and the S/R vehicle in a direction normal to the aisle. The second degree of freedom comprises operation of a shuttle which is mounted on a vertically driven carriage and moves normal to the material storing arrays whereby inventory is retrieved and stored along the aisle. The third degree of freedom comprises vertical drive for the carriage. This invention provides novel vertical drive apparatus and methods for the third degree of freedom.

Presently available S/R vehicles comprise vertical drive components which are individually mounted on the S/R vehicle structure. As such, the presently available vertical drive assemblies are assembled and tested only after the major S/R vertical drive assembly supporting components, which usually comprises an assembled vehicle, are available at a test or job site.

All S/R vehicles must conform to the clearance requirements of the aisle where used. Such requirements predefine a significant width limitation on allowable dimensions of S/R vehicles and parts assembled thereon. In the past, such limitations have led to the development of S/R vehicles which employ vertically mounting of large motors, and therefore, right angle speed reducers to translate vertical motor rotary motion in horizontal plan to a horizontal drum vertical rotary motion which winds and unwinds a vertically disposed lift cable.

Generally, S/R vehicles comprise a mounting frame, a motor mounted to the frame, and a drum assembly which raises and lowers the carriage by winding and unwinding at least one carriage supporting lift cable. A speed reducer is commonly used between the motor and drum to translate relatively high rotational speed of the motor to a lower rotating speed required of the cable winding and unwinding drum.

In the present art, these and two methods of mounting a motor relative to the position of the drum. The first method comprises mounting the drum directly to the speed reducer output shaft and, thereby, directly coupling the motor to the drum along a common axis. In-line connections among the motor, speed reducer, and drum, severely limit the collective and individual sizes of motors, reducers, and drums which may be used and yet stay within the above mentioned width limitation.

To solve problems provided by the first method, the second method, as mentioned above, comprises a vertically disposed and mounted motor and a right angle speed reducer to drive the horizontally disposed drum. A power translation device, capable of withstanding low speed, high torque, driving forces, is disposed between the speed reducer and drum.

The second method has improved space, orientation, and speed flexibility over the first method, but requires a chain be used as the power translation device to drive the drum at the site of maximum tension. Commonly, such use of chains requires frequent maintenance and constant lubrication. Further, chains most often use tensioners which push against the side of the chain to maintain proper tautness in the chain. There is no tensioning required in the first method.

Generally, the present art uses a brake mounted on the end of the motor. Such brakes are usually electrically released, spring actuated disc brakes. Such braking is ineffective when a chain breaks.

BRIEF SUMMARY AND OBJECTS OF THE INVENTION

In brief summary, this invention alleviates all of the known problems related to providing a chain free vertical drive assembly which fits within the width silhouette of S/R vehicles. The vertical drive assembly comprises a mounting frame which supports all of the vertical drive assembly components. In this novel invention, the entire vertical drive assembly is modularly assembled on the mounting frame for facile attachment to and detachment from a vehicle support frame. The mounting frame is releasibly attached to the vehicle support frame by readily accessible mounting bolts.

The mounting frame supports a horizontally positioned motor and a drum assembly. The drum assembly comprises a cable winding drum, a speed reducer mounted in line with and inside the drum whereby the speed reducer serves as a bearing for one end of the drum as well as the speed reducer.

The speed reducer is belt driven by the motor through an input adapter, thereby bypassing the need for a drive chain. The motor is joined to the frame by motor jacks, the adjusting of which tightens or loosens the tension of the belt. As the belt operates at the high speed velocity of the motor, light weight sprocket wheels are used to interconnect the belt to the motor and to the input adapter to reduce starting inertia.

A brake is mounted on the end of smaller horse power motors when the length of the motor and brake do not exceed the width limits of the S/R vehicle. For large horsepower motors which are so wide there is no space for a brake on the motor, a disc brake is used. A compressed air source is provided for braking and other pneumatic controls.

Accordingly, it is a primary object to provide a power transfer subassembly of a vertical drive assembly for an S/R vehicle which comprises a belt drive directly connected to a motor.

It is another primary object to provide a vertical drive assembly in which the motor is horizontally disposed.

It is another object to provide a belt driven vertical drive assembly whereby belt tension is adjusted by moving the motor up and down on motor mounting frame connections.

It is another object to provide jacks which affix the motor to the frame and which provide vertical adjustment of the motor to adjust the tension in the belt.

It is a chief object to provide light weight sprocket wheels for the belt drive to reduce vertical drive assembly starting inertia.

It is an important object to provide a modular vertical drive assembly for the S/R vehicle whereby the vertical drive assembly is assembled before being mounted onto the S/R vehicle.

It is another important object to provide a modular vertical drive assembly for the S/R vehicle whereby the vertical drive assembly is tested before being mounted onto the S/R vehicle.

It is still another important object to provide a modular vertical drive assembly which is facilely attachable to and detachable from a support frame of the S/R vehicle.

It is a further important object to provide a speed reducer for the vertical drive assembly which is located inside, along the axis of a cable winding and unwinding drum of the vertical drive assembly whereby the drum and speed reducer occupy essentially the same dimensional width across the S/R vehicle.

It is a still further important object to provide a vertical drive assembly comprising a wheel drive planetary reducer whereby the most highly loaded components of the vertical drive assembly are produced within the planetary speed reducer gearing.

It is another important object to provide a vertical drive assembly wherein a belt and sprocket wheels are used at the relatively high motor rotational rate where drive loads are lower.

It is a basic object to provide a vertical drive assembly for the S/R vehicle comprising a horizontally mounted motor which belt drives a speed reducer essentially disposed within the core of a cable winding drum.

It is a primary object to provide a vertical drive assembly wherein brakes are juxtaposed and aligned along the axis of the drum rather than juxtaposed the axis of the motor such that the dimensions of large motors and related attachments lie within the width of the S/R vehicle.

It is another primary object to provide a pneumatically powered brake for the vertical drive assembly.

It is another object to provide a chain free vertical drive assembly for the S/R vehicle.

These and other objects and features of the present invention will be apparent from the detailed description taken with reference to accompanying drawings.

DETAILED DESCRIPTION OF THE ILLUSTRATED EMBODIMENTS

In this description, the term proximal is used to indicate the segment of the device normally closest to the viewer of the FIGURE. The term distal refers to the other end. Reference is now made to the embodiments illustrated in FIGS. 1-7 wherein like numerals are used to designate like parts throughout. A side, end, and other side view of a storage and retrieval (S/R) S/R vehicle 10 is provided by FIGS. 1-3, respectively. A currently preferred embodiment of the invention, vertical drive assembly 100 mounted on S/R vehicle 10, is best seen in FIGS. 1 and 3.

Figure 1:
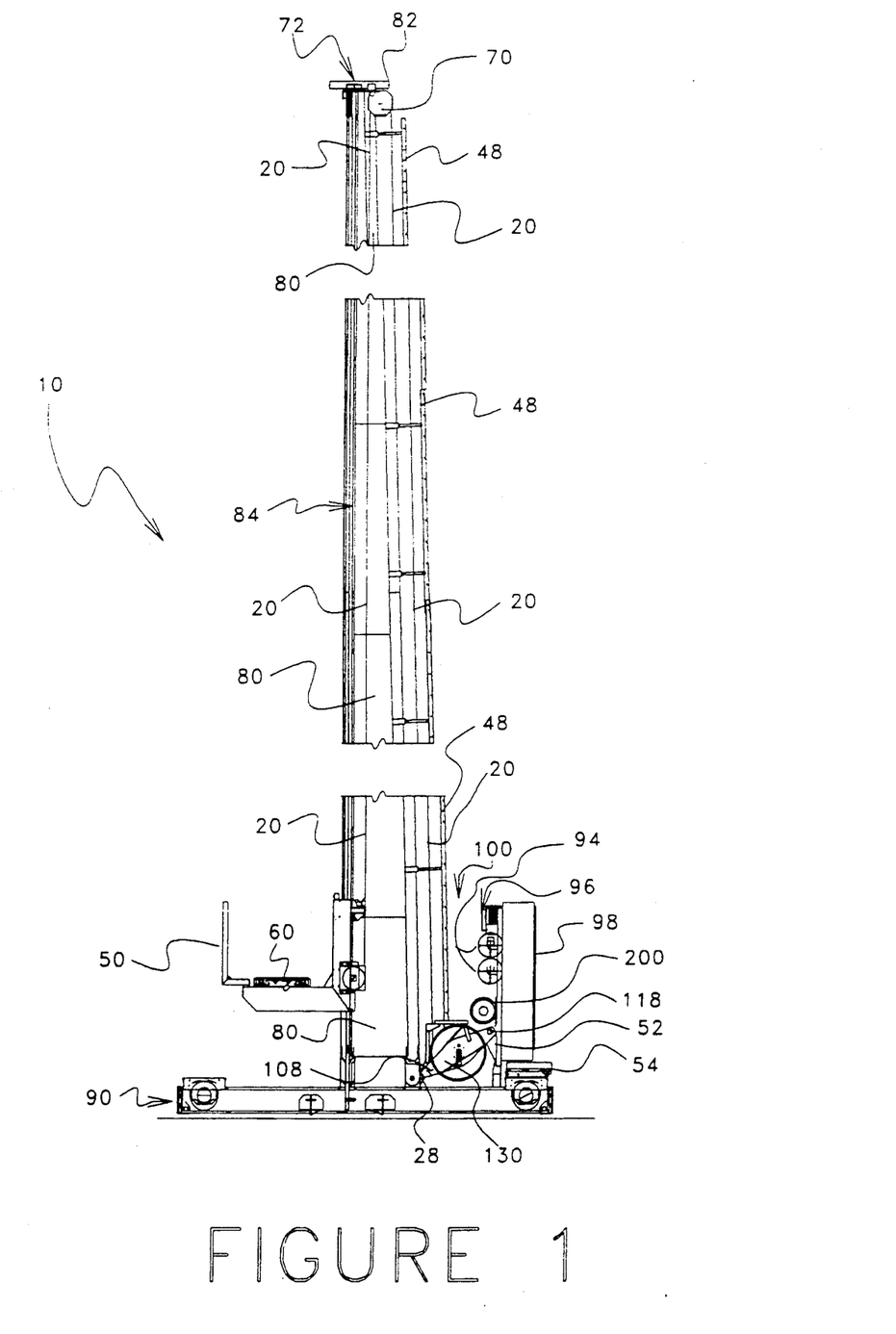
FIG. 1 is an elevation side view of a storage and retrieval (S/R) system showing a carriage on the left side of the viewer and a vertical drive assembly of an S/R vehicle on the right side.

As seen in FIG. 1, S/R vehicle 10 comprises a base 90 upon which S/R vehicle 10 travels on a ground level rail disposed along an aisle where inventory is addressably stored. Rising from base 90 is a mast 80 which extends upward to another rail 82. Mast 80 is held thereat from lateral displacement by rail followers 72 on each side of rail 82. Thereby, S/R vehicle 10 is stably held counter to lateral movement. A carriage 50 is disposed on one side of mast 80 and is raised and lowered therealong. Disposed upon carriage 50 is a shuttle 60 which is laterally displaced at predetermined inventory storage and retrieval sites to deliver and acquire loads as desired by an operator of S/R vehicle 10. One end of a lift cable 20 is attached to carriage 50 and passes upward therefrom through a three pull cable block system 70 and then downward to a cable winding drum 430 which is a part of the invention.

Drum 430 is axially driven to wind and unwind lift cable 20 to lift and lower carriage 50 along two guide rails 84 and 86 or each side of mast 80. An electrical cabinet and control panel 98 is disposed upon base 90 at an end distal to the end of S/R vehicle 10 which provides the path for carriage 50. In the currently preferred embodiment, base 90, mast 80, carriage 50, shuttle 60, cable block system 70, electrical cabinet and control panel 98, and lift cable 20 and related parts are members of a Unit Load System currently produced and available from Eaton-Kenway a subsidiary of Eaton Corporation, 515 East 100 South, Salt Lake City, Utah, 84102 and will therefore not be described in further detail herein.

Figure 2:
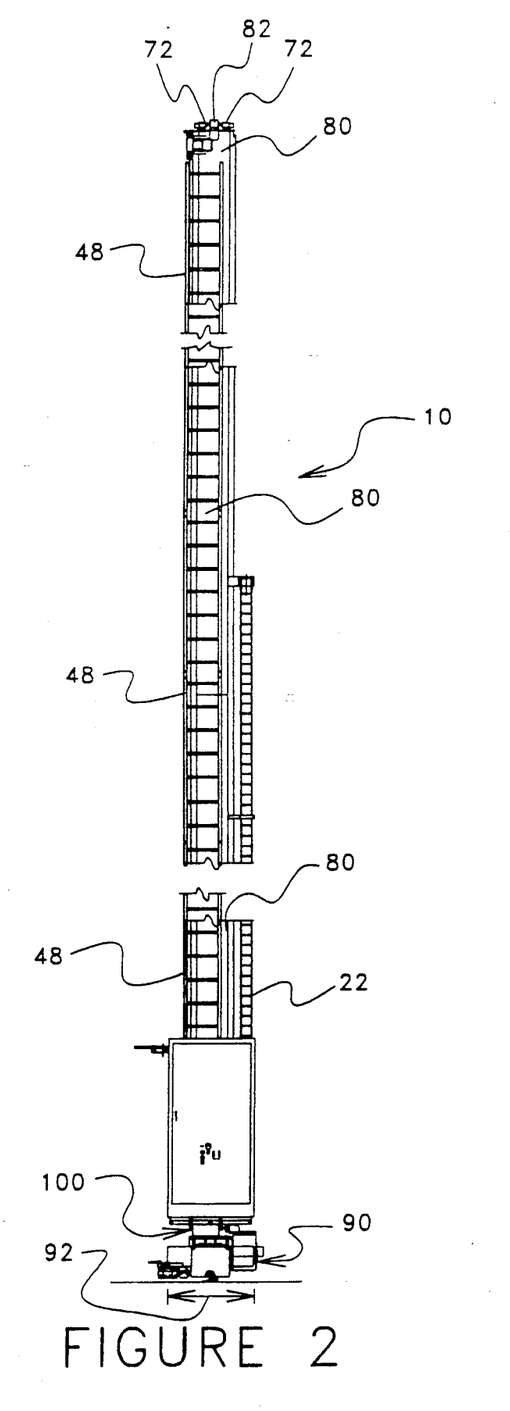
FIG. 2 is an elevation end view of the S/R system showing a portion of the vertical drive assembly and relatively narrow silhouette of the width of the S/R vehicle.
Figure 3:
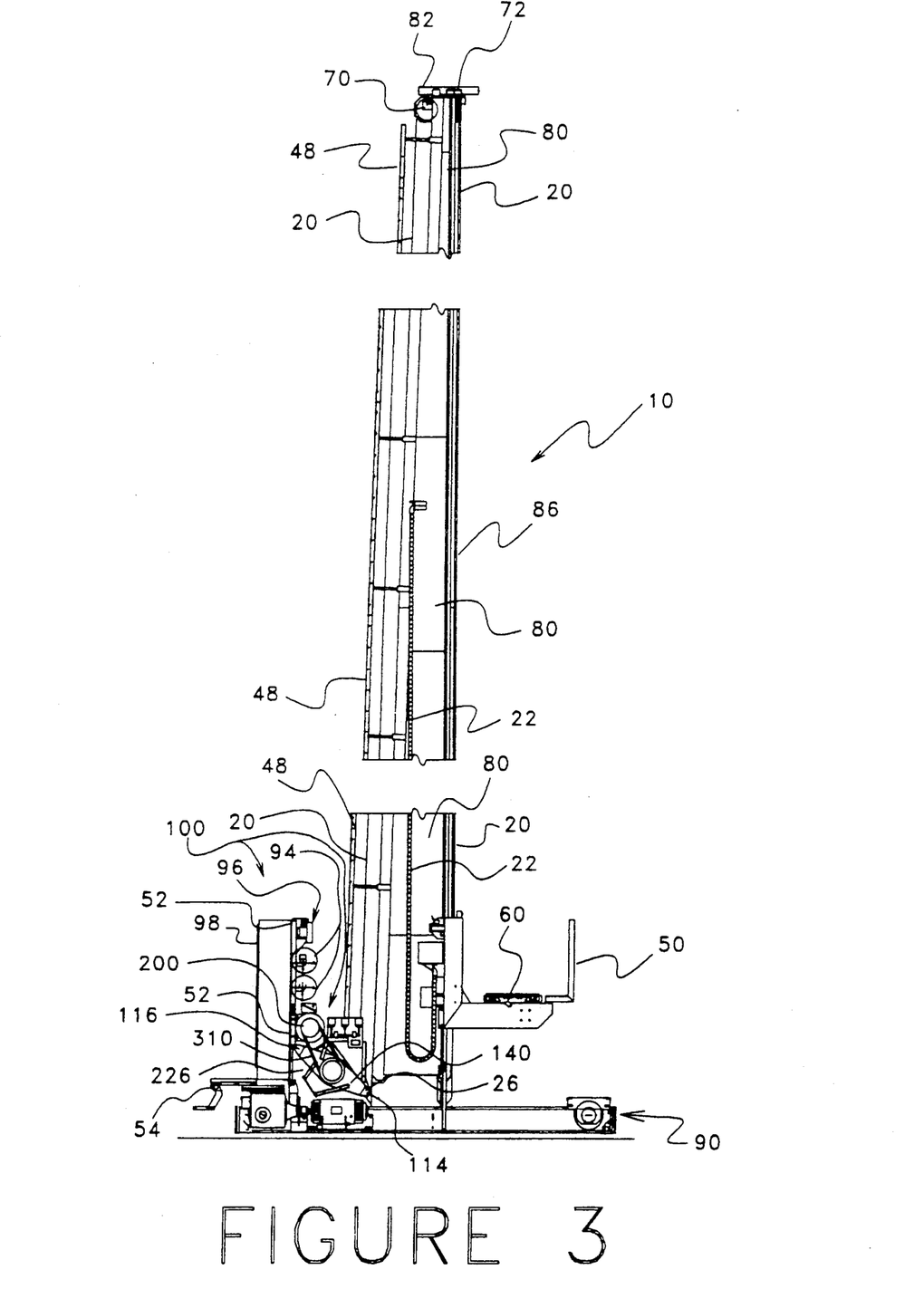
FIG. 3 is an elevation view of the other side of the S/R system.

Seen in FIG. 2, wherein ladder 48 is seen extending upward to provide access to the height of rail 82, the width dimension 92 of all parts of S/R vehicle 10 is a critical design restraint. To allow maximum space for storage, aisle sizes have been set which severely restrict the width 92 of each storage and retrieval vehicle. In the past, this restriction has resulted in the design of vertically mounted motors and use of right angle speed reducers.

Better seen in FIG. 3, which is an opposite side view of the S/R vehicle 10 seen in FIG. 1, are additional parts of the standard Unit Load System comprising an unfolded stair 54, which provides access to the top of base 90, and an electrical cable path protector 22. Stair 54 is seen folded in FIG. 1.

Four views of the invention are seen in FIGS. 4-7. As seen in the side presentation in FIG. 6, vertical drive assembly 100 comprises vertical drive assembly mounting frame 170, a motor 200, motor adjustment jacks 220, power transfer equipment 300, drum 430 and related equipment described in detail hereafter.

Figure 5:
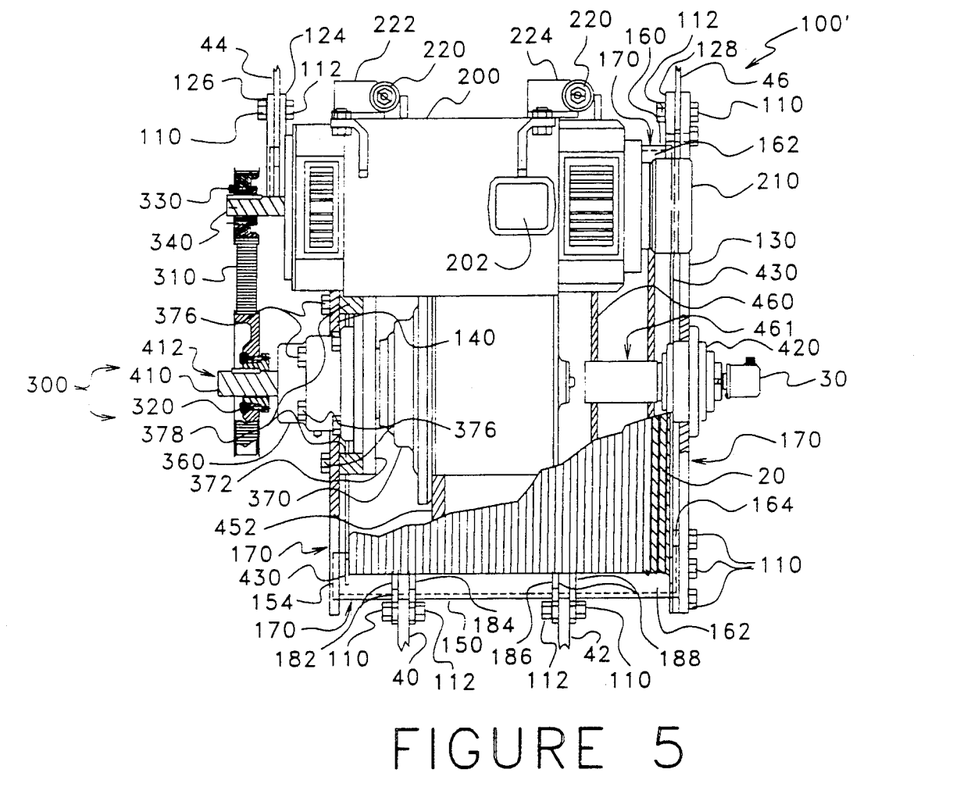
FIG. 5 is a plan view of the vertical drive assembly with parts cut away for clarity of presentation.
Figure 7:
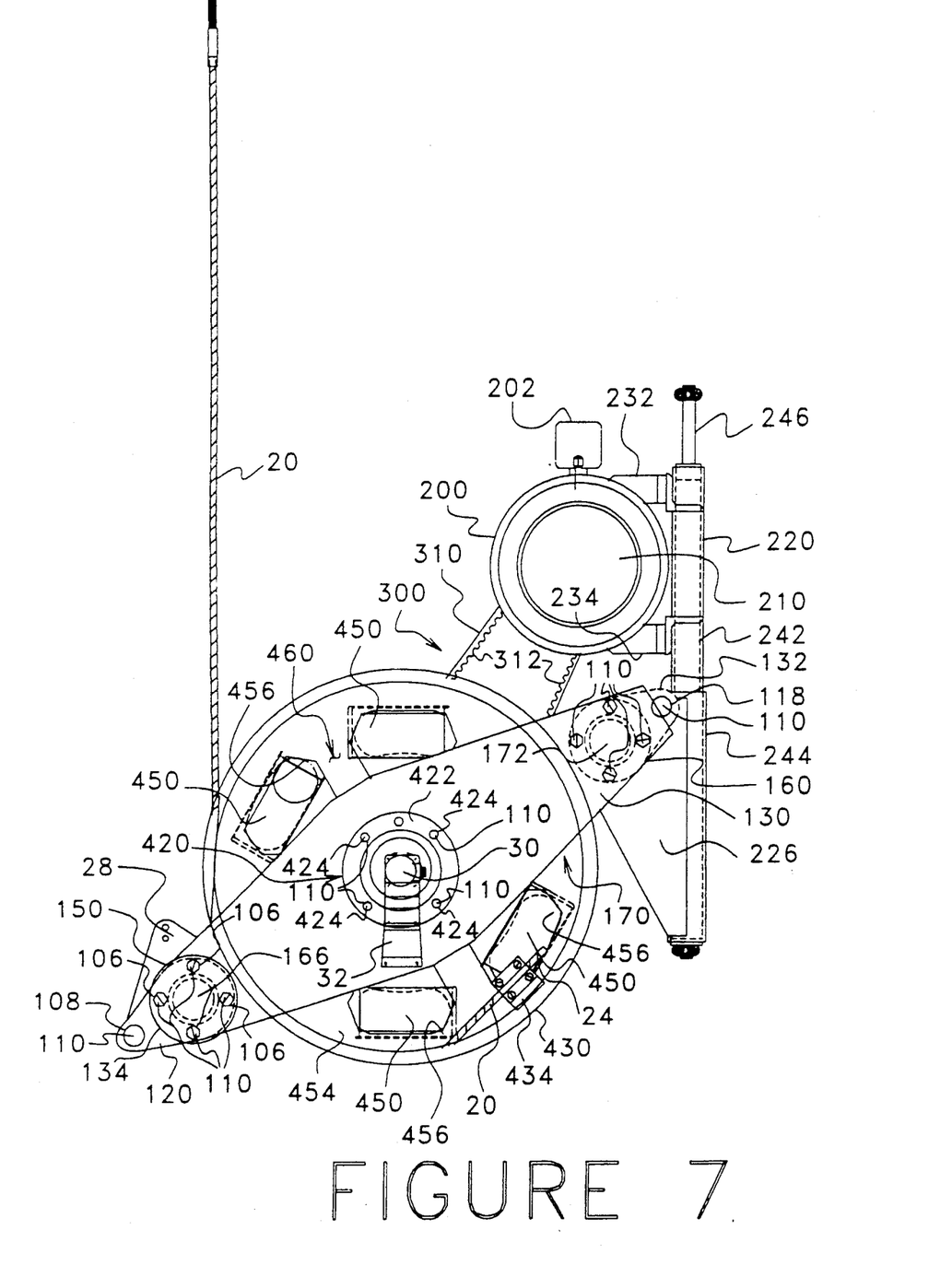
FIG. 7 is an elevation view of a portion of the other side of the vertical drive assembly.

As seen in FIG. 5, vertical drive assembly mounting frame 170 comprises side supports 130 and 140, a lower lateral support 150, and an upper lateral support 160. Each lateral support 150 and 160 comprises a steel cylinder 162 with an attachment ring-plate 164 welded or otherwise permanently affixed at one end. As best seen in FIG. 7, side support 130 and ring-plate 164 comprise corresponding holes at site 106 in the vicinity of lower site 166 in the lower acute end 134 of side support 130. Side support 130 is releasibly attached at lower site 166 to lower lateral support 150 by bolts inserted through the juxtaposed holes at sites 106 in side support 130 and associated ring-plate 164 and firmly affixed thereat. In similar fashion, an end of upper lateral support 160 is affixed to side support 130 at a site 172.

Figure 6:
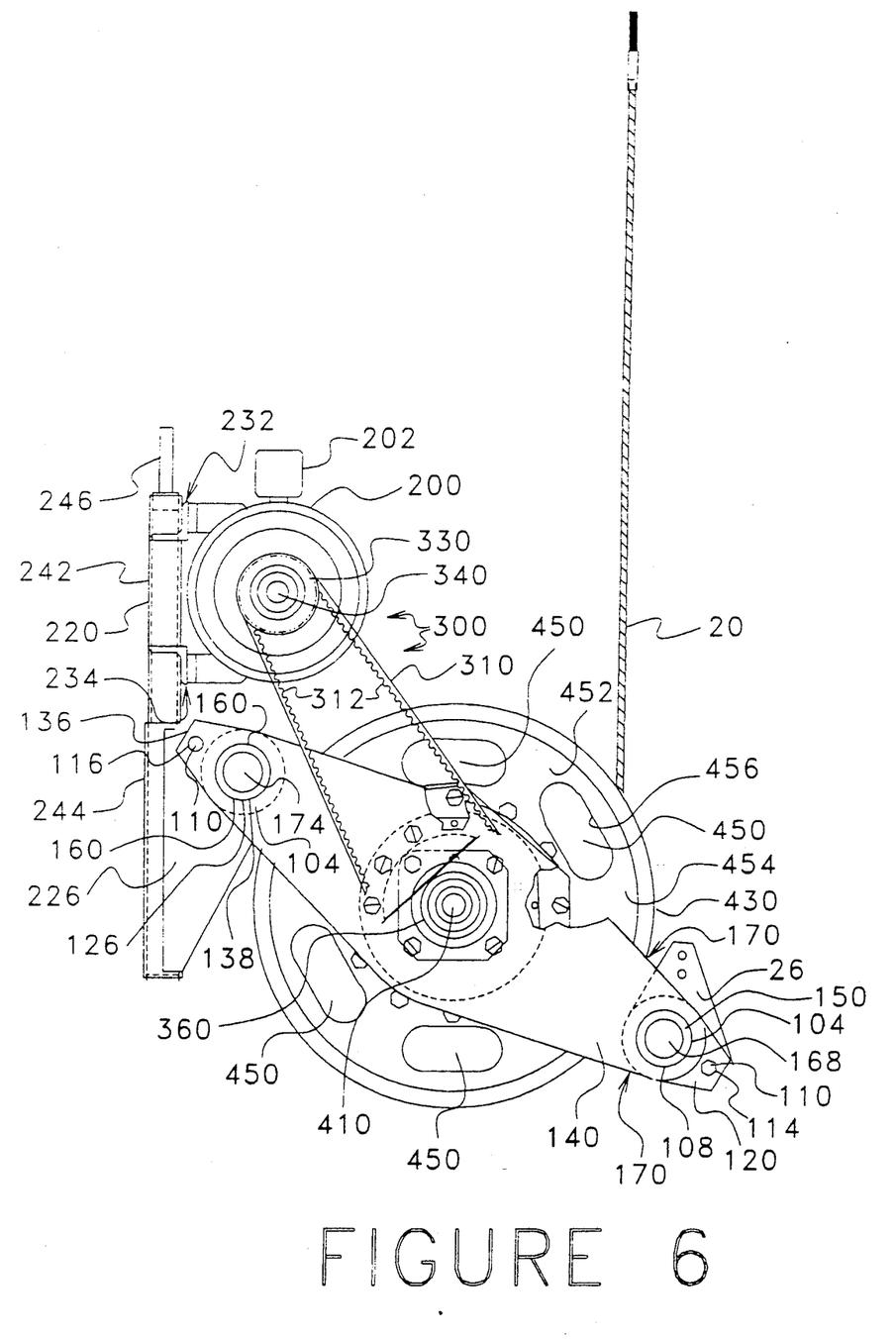
FIG. 6 is an elevation view of one side of the vertical drive assembly wherein a belt attachment is seen between a motor and an input adapter which connects through a planetary speed reducer to a drum.

On the opposite hand side to side support 130, side support 140 is affixed to each lateral support 150 and 160 such that drum 430 rotates freely therebetween. The attachment of lateral supports 150 and 160 to side support 140 is best seen in FIG. 6. At site 174, side support 140 comprises a hole 138 which is substantially the same size as the outer diameter of the cylinder 162 of lateral support 160. Cylinder 162, of lateral support 160, is inserted through hole 138 and side support 140 is welded or otherwise permanently affixed in place. In similar fashion, side support 140 comprises a hole 108 at site 168 wherethrough lateral support 150 is inserted and welded or otherwise permanently affixed to side support 140. As seen in FIG. 5, lateral support 150 comprises a but end 154 at site 168 such that butt end 154 is flush with the exterior side of side member 140 when attached thereto.

Figure 4:
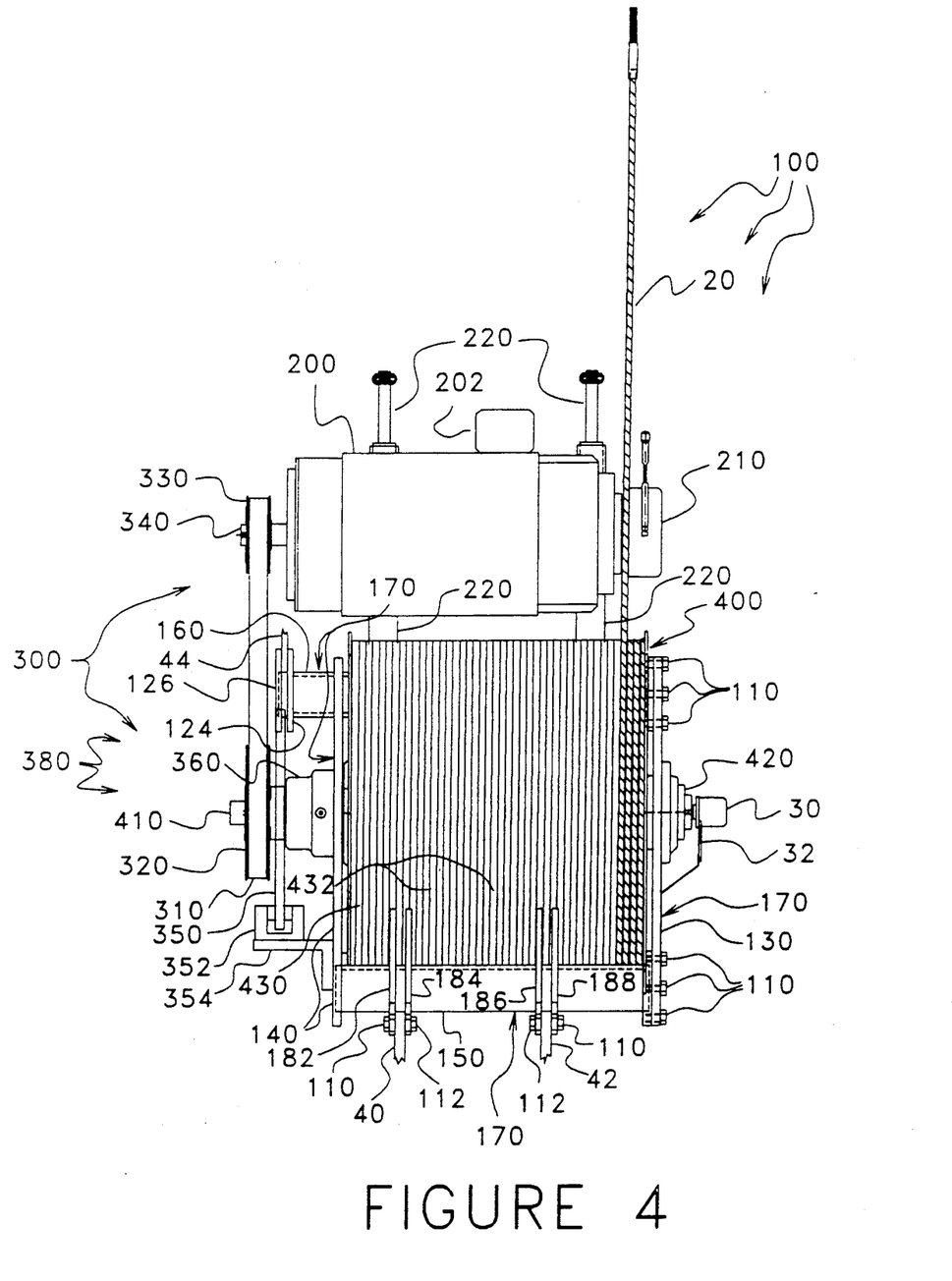
FIG. 4 is a front elevation view of the vertical drive assembly.

As seen in FIG. 4, a ring-mount 126 is attached at cylinder end 102 to lateral support 160. Ring-mount 126 comprises a tear-drop shape with a circular base and extending ear 136 as best seen in FIG. 6. Extending ear 136 comprises a mounting hole 116, the function of which is described later. Ring-mount 126 serves as one of three ring-mount plates on lateral support 160. Each ring-mount comprises substantially the same shape and size. Referring once more to FIG. 4, another mounting ring-mount 124 is seen disposed medially to ring mount 126 along the cylinder of lateral support 160 such that a parallel planar space resides between ring-mount 124 and ring-mount 126. The separation between the ring-mount 126 and ring-mount 124 is substantially the same as the width of a mounting tab 44 shown i part in FIG. 4 and which is a supporting part of the vehicle 10 frame 52 seen in FIG. 3.

Referring to FIG. 5, on the side of vertical drive 100 which comprises side support 130 a third ring-mount 128 is disposed medially to ring-plate 160. Ring-mount 128 is displaced from side support 130 as ring-mount 124 is displaced from ring mount 126. A mounting tab 46 is thereby disposed therebetween.

Each ring-mount 124 and 126 and mounting tab 44 comprise an aligned hole of substantially the same size wherethrough a bolt 110 is inserted and tightened in place by a nut 112 to attach one upper corner of vertical drive assembly 100 to the frame 52 of vehicle 10, as is best seen in FIGS. 3 and 6. In similar fashion, ring-mount 128, mounting tab 46, and side support 130 each comprise a hole at site 118 for passage of a bolt 110 whereby the other upper corner of vertical drive assembly is attached to frame 52 as best seen in FIGS. 1 and 7.

Lower lateral support 150 comprises four medially disposed ring-tabs 182, 184, 186, and 188, used to releasibly attach the lower portion of vertical drive assembly 100 to frame 52. See FIGS. 4 & 7. Each ring-tab is shaped like ring-mount 126 and is permanently attached to lateral support 150 by welding or the like. Ring-tab 182 and 184 are paired and separated to accept a vehicle 10 frame 52 support tab 40 disposed therebetween. Each ring tab 182 and 184 and support tab 40 comprise a juxtaposed hole at site 114 as seen in FIG. 6. A bolt 110 is passed therethrough to attach tab 40 and thereby frame 52 to vertical drive assembly 100 at a third site.

Similarly, ring-tabs 186 and 188 are paired and separated to accept a frame 52 support tab 42 therebetween. Each ring tab 186 and 188 and tab 42 comprise a hole wherethrough an attachment bolt 110 is inserted and tightened with a nut 112 to affix vertical support assembly 100 at a fourth site. Thereby the frame is firmly but releasibly affixed to vehicle 10 at four sites. All of the other components, with the exception of electrical power sources and pneumatic power and compressed air sources, which are provided by vehicle 10, are mounted upon frame 170 which is formed by side supports 130 and 140 and lateral supports 150 and 160. Thus, vertical drive assembly 100 is attached to and detached from vehicle 10 as a unit allowing assembly and test of vertical drive assembly 100 at a site remote from vehicle 10. Frame 170 parts may be constructed from steel.

As best seen in FIG. 7, side support 130 comprises a diamond shape with filletted corners. In addition to the attachment holes at sites 166, 172 and 118, side support 130 comprises a central hole wherethrough a bearing 420 is disposed and attached. Bearing 420 is firmly attached to side support 130 by a mounting ring 422, which comprises holes 424 which are juxtaposed with holes (not shown) in side support 130. Bolts 110 are inserted through holes 424 and like holes in side support 130 and firmly affixed by nuts or the like. Bearing 420 at least partially resides within the core of drum 430 and is connected to drum 430 by radially projecting stiffener plates 460 and stub shaft 461. See FIG. 5.

Also attached to side support 130 by a stationary part 32 is an encoder 30. A movable part of encoder 30 is attached to the drum stub shaft 461 whereby rotation of drum 430 is detected and encoded for transmission to an electronic control system of vehicle 10. Thereby movement of vertical drive assembly 100 is detected for use in monitoring and controlling the positioning of carriage 50. Electrical connections are not shown, but are conventional and well known in the art.

As seen in FIG. 6, side support 140 comprises a diamond shape and an adapter ring 378 and a central hole in both pieces in a fashion similar to side support 130. Side support 140 is affixed by bolts or the like to a speed reducer 370 which is aligned along the axial path of drum 430. As seen in FIG. 5, a reducer mounting flange 372 is firmly attached through the adapter ring 378 by bolts 376 to side support 140 along the line of drum axle 410. Input adapter 360 is attached to the face of the reducer mounting flange 372 with bolts 376. Therealong, input adapter 360 and a speed reducer 370 join to form a final link of power transfer components 300 to drum 430. The power transfer components 300 comprise parts which directly receive output from a motor 200 and thereby drive drum 430 to take-up and release lift cable 20.

When the function of power translation is placed following the function of speed reduction, forces imposed upon the power translation component are consistent with the lower speed, higher torque and require a chain or other high stress linkage. Conversely, by placing the function of power translation before the function of speed reduction, forces imposed on the power translation component are consistent with the higher speeds of motor 200. The higher speed and lower torque permit a belt to be used as the power translation component in vertical drive assembly 100. Chains require constant lubrication during use and regular maintenance. Belts require no lubrication are therefore superior in this application.

Referring to FIG. 5, the serial linkage of power transfer components 300 comprise a drive sprocket wheel 330, a belt 310, a driven sprocket wheel 320, input adapter 360, and speed reducer 370 acting in seriatim to drive drum 430. Drive sprocket wheel 330 connects directly to the axle of motor 200 and engages belt 310 at a first site 340. Belt 310 translates power from drive sprocket wheel 330 to driven sprocket wheel 320 at a second site 412 which is in line with input adapter 360 and axle 410 which is on the axis of the cylinder of drum 430.

As seen in FIG. 6, belt 310 is similar to a timing belt comprising teeth 312 which correspond to the form and separation of sprockets in sprocket wheels 320 and 330. Belt 310 and sprocket wheels 320 and 330 may be Gates Polychain Belt and Sprockets, manufacture by Gates Rubber Company, 990 South Broadway, Denver, Colo. 80217, and distributed by Kaman Bearing and Supply Company, 3173 West 2100 South, West Valley City, Utah 84119.

Sprocket wheels 320 and 330 used in the currently preferred embodiment are aluminum although any lightweight material capable of bearing the stresses of the belt 310 drive may be used. As the sprocket wheels 320 and 330 and therefore belt 310 operate directly off motor 200 at speeds congruent with motor 200 rotational speeds, starting inertia is critical. Aluminum sprocket wheels were specially developed after early tests proved the total starting inertia of steel sprocket wheels was as large as the starting inertia of carriage 50.

Driven sprocket wheel 320 is directly connected to axle 410 and therethrough to input adapter 360. As earlier described, the stationary portion of input adapter is firmly attached to the reducer mounting flange face 372. Input adapter 360 may be part number 00-1311.07, available from Rockford Manufacturing, Roscoe, Ill. The rotary driven portion of input adapter 360 is connected to the input shaft of speed reducer 370.

Speed reducer 370 receives the relatively high rotational speeds of driven sprocket wheel 320 and provides drum 430 with a lower revolutionary rate, but higher torque output. Thus, the most highly loaded components of the drive load are put into planetary gearing. Planetary gears are arranged to transmit the load through multiple load paths resulting in smaller reducer sizes. As seen in FIG. 5, a portion of input adapter 360 and speed reducer 370 reside within the core of drum 430 to provide a narrow silhouette. Speed reducer 370 may be a wheel drive planetary reducer such as part number W12D, available from Fairfield Manufacturing, Lafayette, Ind. Speed reducer 370 connects to drum 430 via reducer mounting ring 452 as is seen in FIG. 5 and is described in more detail hereafter.

In the currently preferred embodiment, motor 200 is horizontally disposed and juxtaposed drum 430 as best seen in FIG. 4. Such juxtaposition of motor 200 next to drum 430 allows relatively large motors disposed horizontally across the width of vehicle 10. A motor 200 is sized and selected for maximum projected load carried by carriage 50 for each vehicle 10 application and may be in excess of 75 horsepower. Each motor 200 is selected from commercially available motors. Such motors are widely used and are known and available in the art. Also, junction boxes which provide electrical connection for motor 200 such as junction box 202 seen in FIGS. 4-7 are known and available in the art.

Motor 200 is adjustably connected to vertical drive assembly 100 frame 170 by two jacks 220. Each jack 220 comprises one tube 242 which telescopically is raised and lowered inside another tube 244. A threaded jacking bolt 246 is rotated to adjust the height of tube 242 relative to tube 244. Each jack 220 may be part number B0069163-001, available from Eaton-Kenway, a subsidiary of Eaton Corporation, 515 East 100 South, Salt Lake City, Utah, 84102. Motor 200 is attached to each jack 220 by an upper support arm 232 and a lower support arm 234 connected to tube 242 such that when tube 242 is raised or lowered, the height of motor 200 is similarly adjusted. By raising and lowering motor 200 the tension in belt 310 is adjusted, thereby permitting belt 310 adjustment without the use of an additional device which provides a measure of additional tension by riding upon and thereby wearing upon belt 310.

Each jack 220 is attached to lateral support 160 of frame 170 by a support member 226. Attachment of each support member 226 is similar to the attachment of ring-mount 128 whereby each support member 226 comprises a hole through which the cylinder of lateral support 160 is inserted and permanently affixed in place by welding or the like. Thereby, motor 200 is attached to frame 170 and made a part of the modular unit vertical drive assembly 100.

In the currently preferred embodiment, a brake 210 is mounted on motor 200 seen in FIGS. 4, 5, and 7. However, such mounting of brake 210 on the axis of motor 200 is restricted when the length of motor 200 and brake 210 exceed the allowable width dimension 92 of vehicle 10. Brake 210 comprises a concentric disc and is spring actuated and electrically released.

In another currently preferred embodiment wherein the combined motor 200 and brake 210 length exceed allowed width dimension 92, a disc brake 350 is used. See FIG. 4. Brake 350 is disposed on the axis 410 of the cylinder of drum 430 medial to driven sprocket wheel 320. Brake calipers 352 are attached to a support which is firmly affixed to frame 170. Brake 350 is also used when it is desired to brake lift cable 20 travel beyond belt 310 in the power transfer linkage.

In this other currently preferred embodiment the calipers 352 are spring actuated, compressed air released. Compressed air is supplied from at least one air holding tank 94 which is powered by a pneumatic pump 96. As see in FIG. 1, air holding tanks 94 and pneumatic pump 96 are mounted on the inner side of electrical control box 98. Air holding tanks 94 comprise an air safety release valve, air delivery piping, and solenoid valves for flow control and release venting. Interlocks are also included in vehicle 10 electrical controls to prevent vehicle 10 from operating when air pressure is inadequate to activate brake calipers 352 to release brake 350. As an additional safety factor, inadequate air pressure also does not activate the brake calipers 352 which continue to grip brake 350 due to the spring actuation. See FIG. 4.

Drum 430 comprises a helically grooved surface 432 which guides the winding of lift cable 20. Drums with such surfaces are known and available in the art. As seen in FIG. 7, lift cable 20 is firmly affixed to drum side support 454 by a cable clamp 434. Such cable clamps 434 are also known and available in the art. Thereby, lift cable 20 is anchored on one end 24 to drum 430. The wound part of lift cable 20 is disposed upon the surface 432 of drum 430. From the surface of drum 430, lift cable 20 follows a path upward to three pull cable block system 70. Through cable block system 70, lift cable 20 follows a path directly to carriage 50 where it is anchored to lift and control lower carriage 50 along guide rails 82 and 84, seen in FIGS. 1 and 3.

Drum 430 derives central bearing support from bearing 420 and speed reducer 370. Stiffener plates 460 are centrally attached to bearing 420 and extend radially outward to be internally affixed to and provide support for the stub shaft 461 end of drum 430. Similarly, at least one reducer mounting ring 452 is centrally attached to speed reducer 370 and extends radially outward to be internally affixed to and provide support for drum 430 on the input adapter 360 side of drum 430.

As seen in FIGS. 6 and 7, drum 430 on the bearing end comprises a pair of drum side plates 460 which comprise regularly spaced holes 450 allowing air passage therethrough. On the reducer end, a reducer mounting ring 452 comprises at least one hole 452 with louver 450 which forcibly fan the air when drum 430 rotates. Thus when drum 430 rotates to move carriage, air is circulated within the core of drum 430 wherein speed reducer 370 and a portion of bearing 420 and input adapter 360 reside providing cooling therefor.

To cause vertical drive assembly 100 to raise or lower carriage 50, horizontally disposed motor 200 is energized to directly rotate drive sprocket wheel 330 which is part of power transfer assembly 300. In seriatim, the other parts of the power transfer assembly 300 transfer power to drum 430. Drive sprocket wheel 330 moves belt 310 at the higher linear speeds derived from motor 200 and drive sprocket wheel 310 rotational rates. Similarly, belt 310 translates the higher linear speed to rotationally drive driven sprocket wheel 320 which provides input rotary motion to input adapter 360. Input adapter 360 transfers power along the axis of drum 430 to speed reducer 370 which is located within the core of drum 430. Speed reducer 370 transfers a lower, but higher torque rotation to drum 430 which shortens and lengthens the free end of lift cable 20.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of claims are therefore intended to be embraced therein.

What is claimed and desired to be secured by Letters Patent is:

1. A storage and retrieval vehicle comprising:
   means for driving the vehicle longitudinally along an aisle beside which inventory is addressably stored;
   a base and a mast supported upon said base;
   a vertically driven carriage eccentrically supported by said mast for selective vertical movement to acquire and deposit the inventory;
   a unitary vertical drive assembly comprising means by which the carriage is selectively displaced up and down, frame means and connectors by which the unitary vertical drive assembly is releasibly and operably mounted on the vehicle above the base directly adjacent the mast whereby the unitary vertical drive is selectively mounted to and dismounted from said releasible and operable position on the storage and retrieval vehicle as a single unit; said connectors comprising releasible fasteners.

2. A storage and retrieval vehicle according to claim 1 wherein the vertical drive assembly comprises a carriage lift cable attached on one end to the carriage and a horizontally disposed cable winding drum attached to the other end of the carriage lift cable.

3. A storage and retrieval vehicle according to claim 2 wherein the vertical drive assembly comprises a motor for driving the drum longitudinally juxtaposed the cable winding drum.

4. A storage and retrieval vehicle according to claim 3 wherein the vertical drive assembly comprises a power transferer interposed between the motor and cable winding drum, the power transferer comprising at least one notched belt.

5. A storage and retrieval vehicle according to claim 4 wherein the vertical drive assembly comprises a speed reducer disposed between the cable winding drum and the notched belt.

6. A storage and retrieval vehicle according to claim 5 wherein the cable winding drum comprises a hollow core comprising means for mounting the speed reducer within the hollow core.

7. A storage and retrieval vehicle according to claim 5 wherein the speed reducer comprises planetary speed reduction means.

8. A storage and retrieval vehicle for obtaining and delivering inventory at an addressable array along an aisle where the vehicle travels, said vehicle comprising;
   at least one carriage upon which inventory is carried and delivered;
   vertical drive means which move the carriage vertically;
   a frame upon which the vertical drive means are mounted on the vehicle and which comprises means for facilely attaching and removing the vertical drive means as a single unit from the vehicle;
   the vertical drive means further comprising:
      cable winding means comprising a cable which is attached to the carriage to lift and lower the carriage as the cable winding means shorten and lengthen an unwound portion of the cable disposed between the cable winding means and the carriage and which comprise a cable winding drum having a substantially hollow core along the longitudinal axis thereof;
      horizontally disposed motor means juxtaposed the cable winding drum, said motor means comprising means for outputting drive power at a high speed relative to a predetermined rate of travel for the cable winding means; and
      means for transferring power directly from the motor means to the cable winding means, the power transferring means further comprising means including a wheel drive planetary reducer for delivering power to the cable winding means at a reduced speed relative to the output speed of the motor;
      the power transferring means comprising means for mounting the wheel drive planetary reducer within the substantially hollow core of the cable winding drum.

9. A vertical drive assembly according to claim 8 wherein the power transferring means comprise a notched belt interposed between the motor means and the wheel drive planetary reducer.

10. A vertical drive assembly according to claim 8 wherein the vertical drive means further comprise pneumatically activated power braking means.

11. A vertical drive assembly for vertically moving a load accessing and delivering carriage of a storage and retrieval vehicle, said assembly comprising:
   cable means which comprise a cable attached on one end to the carriage;
   a cable winding drum attached to the other end of the cable and which lifts and lowers the carriage as the cable is wound upon and unwound from the cable winding drum causing an unwound portion of the cable to shorten and lengthen;
   a cable winding driver comprising a horizontally disposed motor longitudinally juxtaposed the cable winding drum and a power transferer interposed between the motor and the cable winding drum, the power transferer comprising at least one notched belt non-slippingly engaged with at least one drive sprocket wheel directly communicating with the motor and also non-slippingly engaged with at least one driven sprocket wheel disposed to rotate about the longitudinal axis of the cable winding drum;
   the power transferer further comprising a speed reducer disposed distally from the motor, the notched belt being located between the speed reducer and the motor.

12. A storage and retrieval vehicle according to claim 11 wherein the cable winding drum comprises a hollow core comprising means for mounting the speed reducer within the hollow core.

* * * * *